Dec. 6, 1927.

W. R. HENDRIX

DISK BRAKE

Filed Nov. 4, 1925

Inventor
WILLIAM R. HENDRIX

Munn & Co.
Attorney

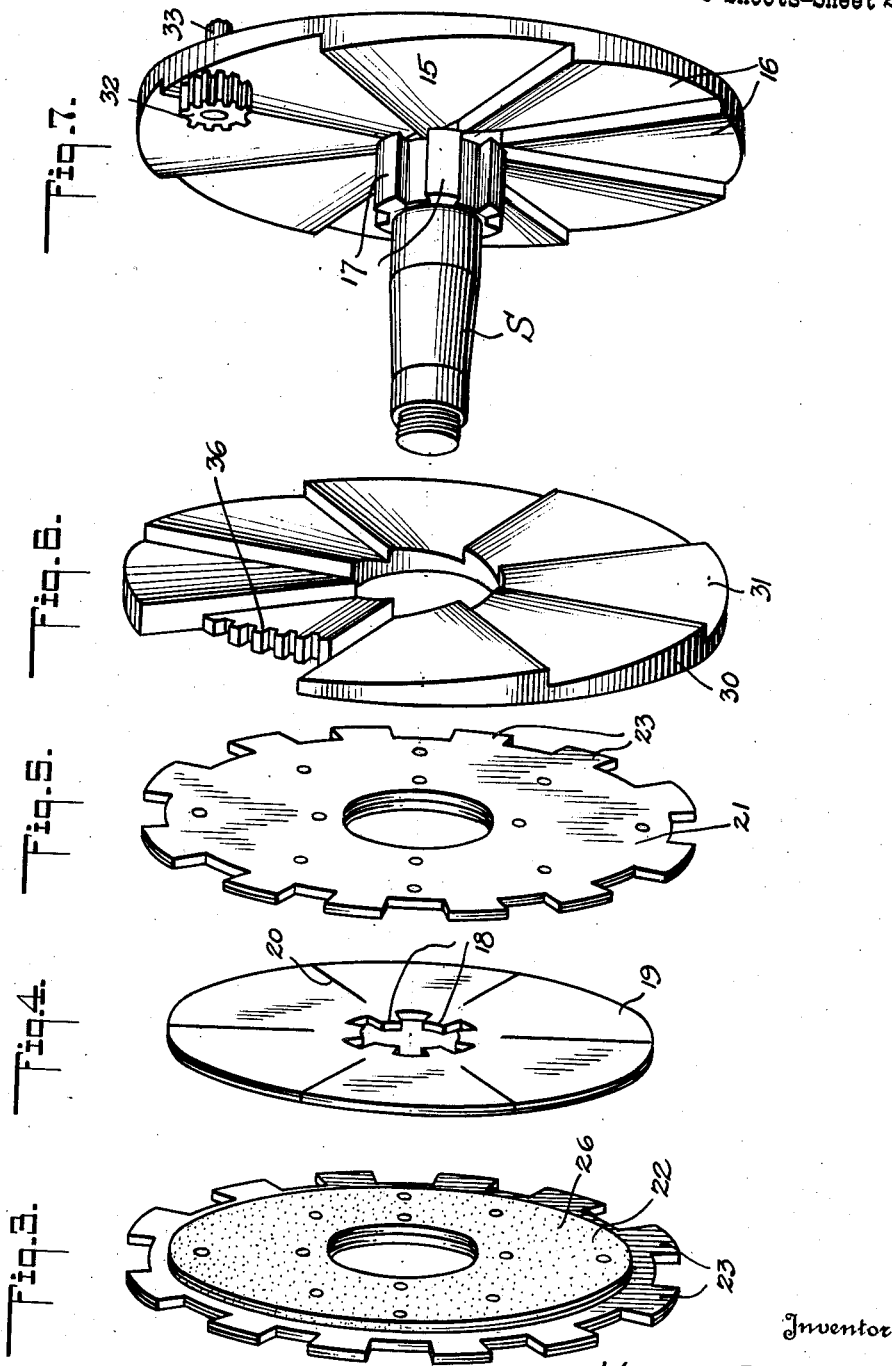

Patented Dec. 6, 1927.

1,652,130

UNITED STATES PATENT OFFICE.

WILLIAM RUDYARD HENDRIX, OF WILMINGTON, CALIFORNIA.

DISK BRAKE.

Application filed November 4, 1925. Serial No. 66,844.

My invention relates to brakes of the disk type, particularly adapted, although not necessarily, for use on the front wheels of motor vehicles.

It is a purpose of my invention to provide a disk brake of extremely simple, inexpensive and durable construction which is capable of being readily assembled and disassembled to permit refacing of the braking disks when necessary, and one in which the maximum braking action can be gradually or rapidly effected, and irrespective of the position of the front wheel of a motor vehicle when applied thereto.

I will describe only one form of disk brake embodying my invention, and will then point out the novel features thereof in claims.

In the drawings

Figures 3 to 7 are detail views showing in perspective the parts of the brake shown in the preceding views.

Similar reference characters refer to similar parts in each of the several views.

Figure 1:
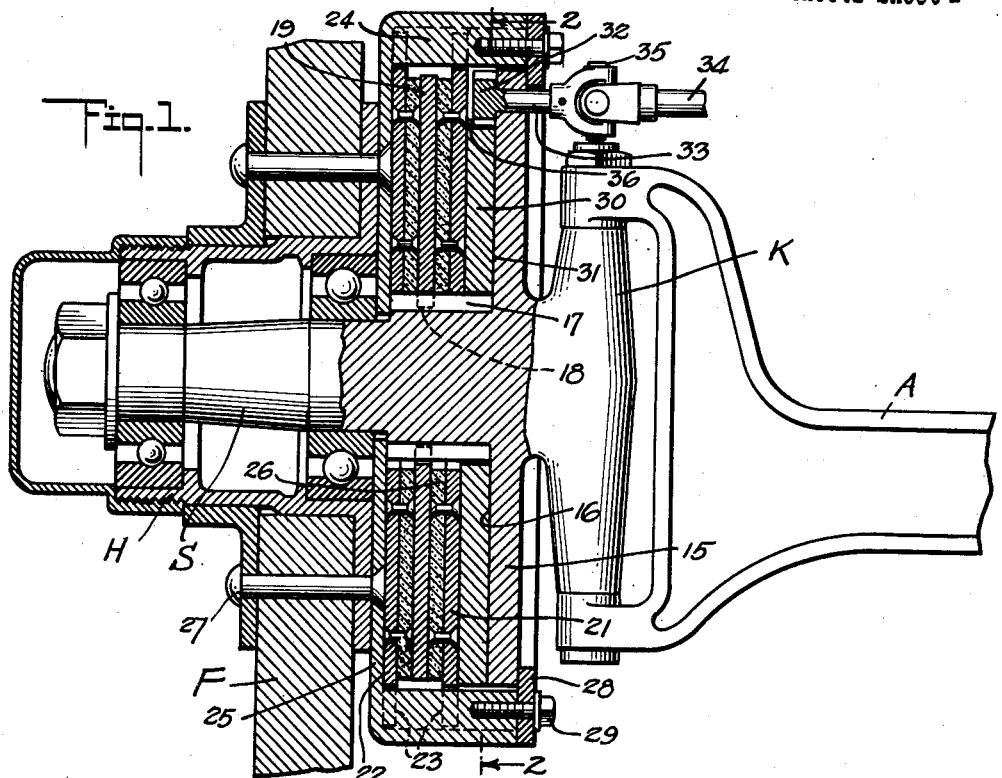
Figure 1 is a view showing in vertical section, and partly in elevation, one form of disk brake embodying my invention in applied position to the front wheel of a motor vehicle.

Referring specifically to the drawings, and particularly to Figure 1, my invention in its present embodiment is shown associated with the front wheel F of a vehicle including a conventional form of hub assembly, designated generally at H, and rotatably mounted on a stub axle S connected to the front axle A of the vehicle through the conventional form of knuckle K.

The stub axle S, as illustrated to advantage in Figure 7, is formed integral with a stationary cam member 15 in the form of a disk provided on one face with an annular series of cam surfaces 16. Also formed integral with the stub axle adjacent the cam member 15 is an annular series of longitudinally extending lugs 17, circumferentially spaced to accommodate complemental lugs 18 formed centrally in what I term a stationary braking disk 19. Through the medium of the lugs 17 and 18 the disk 19 is fixed to the stub axle against rotative movement thereon, but is capable of lateral movement in either direction for a purpose which will be hereinafter described. This disk 19 is preferably formed of steel and is split radially, at intervals, as indicated at 20, to permit the necessary expansion thereof when heated.

Figure 2:
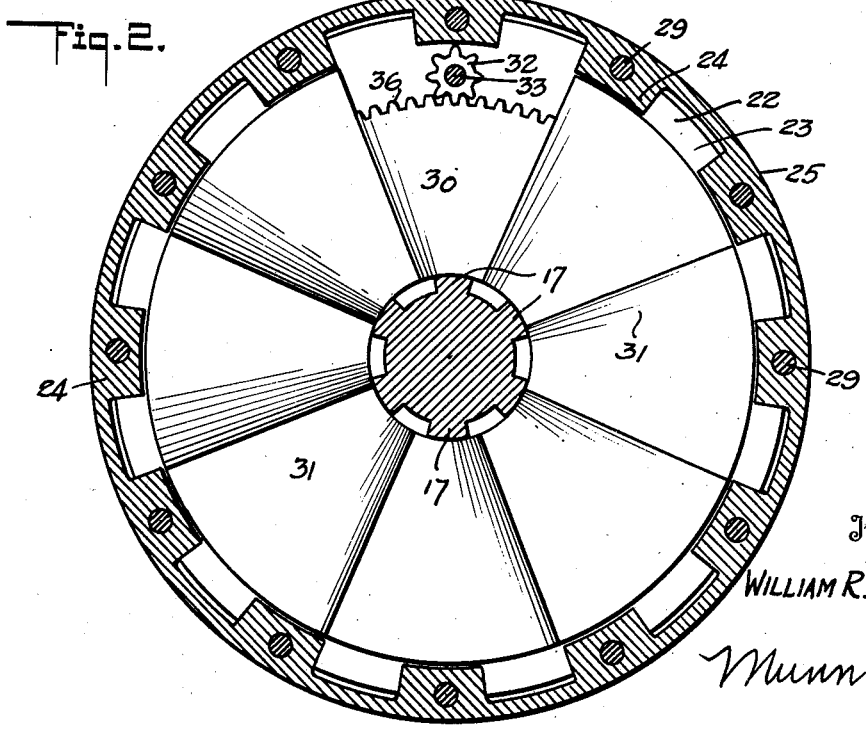
Figure 2 is a vertical sectional view taken on the line 2—2 of Figure 1.

As shown in Figure 1, a pair of braking disks 21 and 22 are loosely mounted upon the stub axle S at opposite sides of the disk 19, and as shown in Figures 3 and 5 these disks are provided with peripheral lugs 23 spaced to accommodate therebetween an annular series of lugs 24 formed on the inner periphery of a housing 25 (Figure 2). The construction of the lugs 24 is such as to allow lateral movement of both of the braking disks 21 and 22 in order that they may be moved into or out of braking engagement with respect to the disk 19. These disks 21 and 22 are provided at their confronting sides with facings 26 of asbestos or other suitable braking material adapted to contact with the opposite sides of the disk 19 to set up the desired braking action.

The housing 25, as shown in Figures 1 and 2, is in surrounding relation to the stub axle S and is of sufficient diameter to accommodate the several disks and cam member, the outer side of the housing being secured to the hub assembly H by rivets 27 so as to rotate with the wheel F and to thereby effect rotation of the braking disks 21 and 22. The inner side of the housing is provided with a ring 28 secured thereto by screw bolts 29 and arranged in overlapped relation to the cam member 15 to prevent accidental displacement of the stub axle and brake from the wheel and housing.

As shown in Figure 1, a second cam member 30 is interposed between the braking disk 21 and the first cam member 15. This cam member 30 is freely rotatable on the stub shaft S and is provided at one side with an annular series of cam surfaces 31 complemental to the cam surfaces 16 so that when the cam member is rotated in one direction or the other it will operate to effect lateral movement of the adjacent braking disk 21 and the disk 19 to move the latter into or out of braking engagement with each other and with the other braking disk 22. The cam member 30 is capable of rotation in either direction through the medium of a pinion 32 fixed to a stub shaft 33 journaled in the cam member 15 and having connection with a shaft 34 through the medium of a universal joint 35, the axis of the latter being in vertical alinement with the axis of the knuckle.

The shaft 34 is adapted to extend to a pedal or lever (not shown) by which it can be manually rotated and thus effect rotation of the pinion 32 in either direction. The pinion constantly meshes with a segmental rack 36 formed on the cam member 30 so that by rotation of the pinion the cam member can be rotated in either direction.

In operation, the housing 25 and consequently the braking disks 21 and 22 rotate with the wheel F, and with the cam member 30 in normal position no braking action is set up between the disks 21 and 22 and the stationary disk 19. However, upon rotating the cam member 30 to effect coaction of the complementary cam surfaces 16 and 31, the cam member is shifted laterally to force the disks 19 and 21 into braking relation with respect to each other and the disk 22 into braking relation with respect to the disk 19. As the disk 19 is stationary, it will be clear that rotation of the disks 21 and 22 is retarded and hence rotation of the wheel F, and by rotation of the cam member 30 to its limit of movement it will be manifest that the disks 21 and 22 can be locked against rotation to bring the wheel F to a standstill. By reversing the movement of the cam member 30 the braking disks are free to move out of braking engagement with each other so as to release the wheel F.

Although I have herein shown and described only one form of disk brake embodying my invention, it will be understood that various changes may be made therein without departing from the spirit of the invention, and within the spirit and scope of the appended claims.

I claim:

1. A disk brake comprising in combination with a stub axle mounted for pivotal movement, a disk cam member fixed to the stub axle, lugs on the stub axle, a braking disk mounted on the stub shaft and having lugs coacting with the first lugs to secure the disk against rotation on the stub axle but to permit lateral movement thereof, a pair of braking disks rotatable on the stub axle and arranged at opposite sides of the first braking disk, said pair of disks having peripheral lugs, a housing adapted to be fixed to a wheel mounted on the stub axle, lugs in the housing engageable by the lugs of a pair of disks so that a pair of disks rotate with the housing, a second cam member rotatable on the stub shaft and interposed between the first cam member and the adjacent braking disk, complemental cam surfaces formed on the confronting sides of the cam members, and means by which the second cam member can be rotated in either direction in the manner and for the purpose described.

2. A disk brake as embodied in claim 1, wherein said means comprises a shaft journaled in the first cam member, a pinion fixed to the shaft, and a rack on the second cam member meshing with said pinion.

3. A disk brake as embodied in claim 1, wherein the confronting sides of the pair of braking disks are provided with facings.

4. A disk brake as embodied in claim 1, wherein the first braking disk is split radially at intervals for the purpose described.

5. A disk brake comprising a braking disk movable laterally but fixed against rotation, a pair of braking disks at opposite sides of the first braking disk adapted for rotation with a rotatable member and with one of the disks movable laterally, cam means comprising movable and fixed cam members having complemental cam surfaces, a segmental rack formed on the movable member, and a gear rotatably mounted on the fixed member in meshing engagement with the rack and adapted to be rotated to cause rotation of the movable cam member to move the first disk and the laterally movable second disk into braking engagement with each other and with the remaining second said disk.

6. A disk brake comprising in combination a nonrotatable axle having a cam member, a braking disk on the axle, co-acting means on the disk and axle operating to prevent rotation of the disk, but to permit lateral movement of the disk, a pair of braking disks rotatable on the axle and arranged at opposite sides of the first braking disk, a housing adapted to be fixed to a wheel mounted on the axle, co-acting means on the housing and pair of disks for effecting rotation of the pair of disks with the housing but permitting lateral movement of one of the pair of disks, a second cam member rotatable on the axle and interposed between the first cam member and the adjacent braking disk, complemental cam surfaces formed on the confronting sides of the cam members, and means by which the second cam member can be rotated in either direction for the purpose described.

WILLIAM RUDYARD HENDRIX.